C. V. LOGWOOD.
OSCILLATION GENERATOR SYSTEM.
APPLICATION FILED FEB. 21, 1917.
1,351,776.
Patented Sept. 7, 1920.
2 SHEETS—SHEET 1.
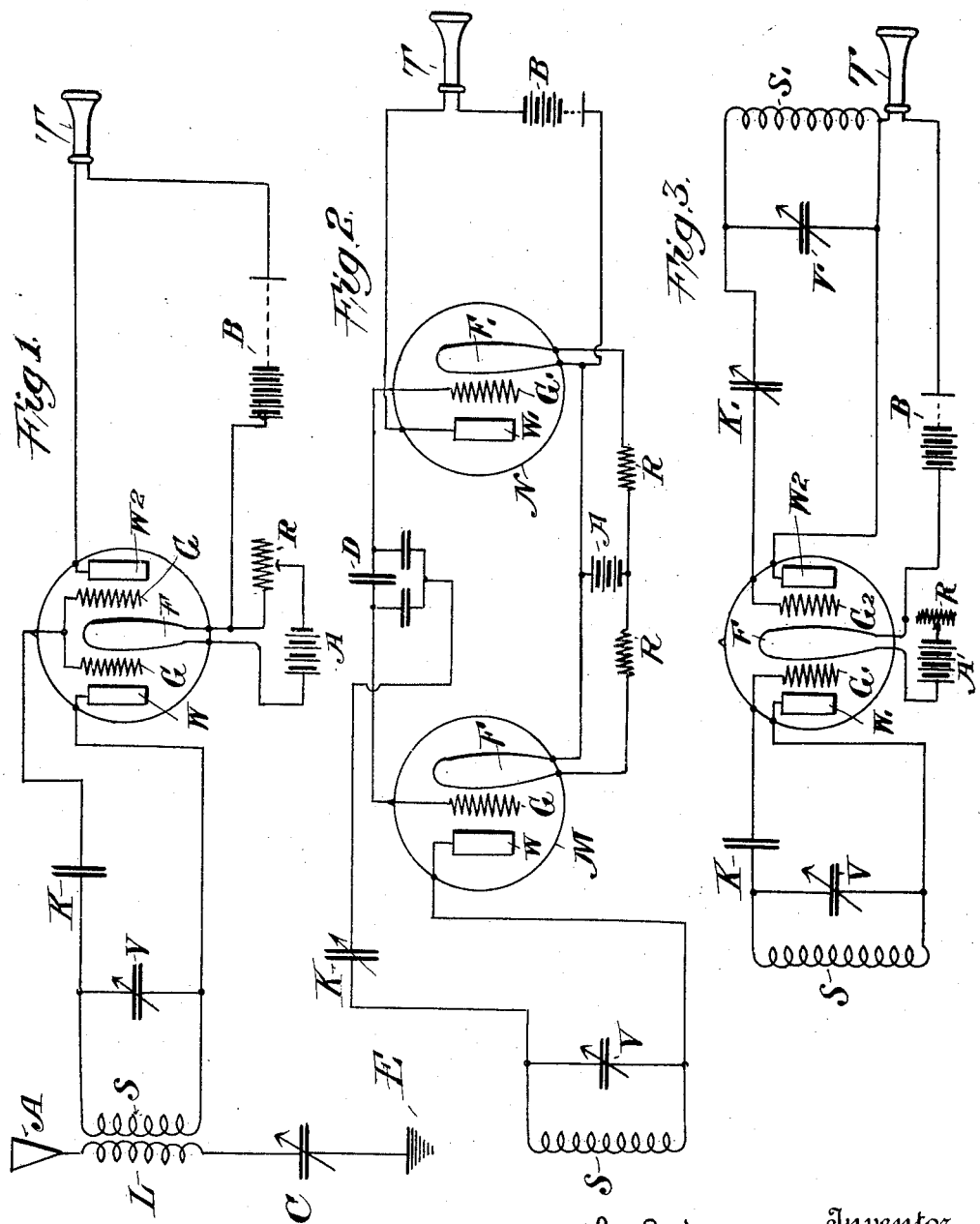
Inventor
Charles V. Logwood
By his Attorney
Samuel E. Darby

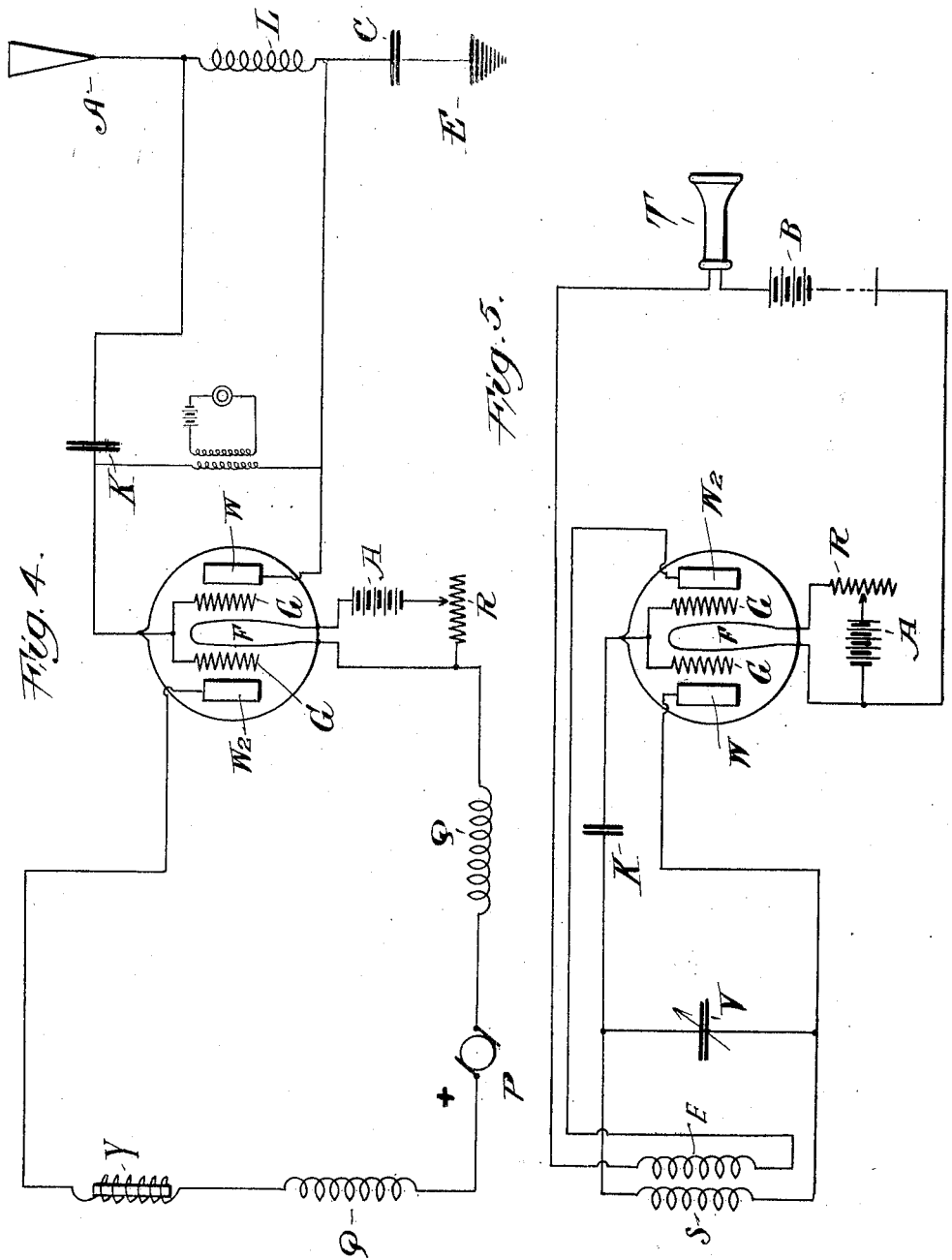

UNITED STATES PATENT OFFICE.

CHARLES VEYNE LOGWOOD, OF NEW YORK, N. Y.

OSCILLATION-GENERATOR SYSTEM.

1,351,776.         Specification of Letters Patent.    Patented Sept. 7, 1920.

Application filed February 21, 1917. Serial No. 150,221.

*To all whom it may concern:*

Be it known that I, CHARLES V. LOGWOOD, a citizen of the United States, residing at New York, in the county and State of New York, have made a certain new and useful Invention in Oscillation-Generator Systems, of which the following is a specification.

This invention relates to oscillation generators, and particularly to generators of this nature employed in radio communication.

The object of the invention is to provide an oscillation generator and system which is simple and efficient.

A further object of the invention is to provide new circuit arrangements for an audion oscillation generator system.

A further object of the invention is to insulate the oscillating circuit of an audion generator from all current and electromotive force employed in the normal system.

Further objects of the invention will appear more fully hereinafter.

The invention consists substantially in the construction, combination, location, and circuit arrangement employed, all as will be more fully hereinafter set forth, as shown in the accompanying drawing, and finally pointed out in the appended claims.

Referring to the drawings:—

Figure 1 is a diagrammatic view of a system embodying my invention.

Fig. 2 is a modified arrangement of the receiving system embodying my invention.

Fig. 3 is a still further modified arrangement of a receiving system embodying my invention.

Fig. 4 is a diagrammatic view of a transmitting system embodying my invention.

Fig. 5 is a further modified receiving system.

The same part is designated by the same reference numeral wherever it occurs throughout the several views.

I have discovered that the audion will act to generate oscillations when the electrodes thereof, and particularly the cold electrodes which are connected to the oscillatory circuit of the system, are thoroughly insulated from all source of current or electromotive force which supplies the hot or filament electrode, and the other cold electrodes of the audion.

In Fig. 1 of the drawing, I show a receiving system wherein A designates the antenna, which is connected to the earth E through inductance L and variable capacity C in the usual or well known manner. Associated with the antenna-earth system, is the series oscillation circuit comprising the inductance S and capacity V, in parallel, and which circuit is connected to the plate electrode W, and to the grid electrodes G through the condenser K. The filament electrode F of the audion is heated by the source of current A through the variable resistance R in the usual manner, and the second plate electrode $W_2$ is connected to filament F through the receiving device T, and the source of electromotive force B in the usual well known manner.

It will be seen that the oscillatory circuit K, V, S, which connects the electrodes W, G, is thoroughly insulated from the current source A and the battery B.

With the foregoing arrangement, I find that the audion becomes an efficient generator of oscillations. While I do not claim to know the scientifically correct theory of the operation of the device when connected up as shown, a theory which explains the phenomena, and which I, at this time, consider to be satisfactory if not correct, is that the plate W, being positive and the filament F being negative, electrons are caused to flow from the filament F to the plate W, thereby producing a conductive path from the filament to the plate and by the grid G. Charges therefore accumulate on the grid G, charging the plate W positively. Negative electrons then collect upon the plate W, thus neutralizing the first charge. This causes a rush of current from the filament to the plate W, and the equilibrium is thus restored again to the oscillatory circuit.

Many modifications will readily occur to those skilled in the art without departing from the spirit or scope of my invention, as defined in the claims.

For example, in Fig. 2, I show a simple arrangement wherein my invention is applied to an audion of the single grid, single plate type. In this arrangement I employ two of said single grid, single plate audions, designated at M and N. The oscillatory circuit is connected to the electrodes W and G, of the audion M, and the receiving device is connected to the filament and plate $F_1$, $W_1$, of the audion N. The grid G, of audion N is connected to the grid G of audion M through the condenser D, and the filaments F, F₁, are fed from the common source A.

Again, in Fig. 1, it will be noted that the grid electrodes are connected in parallel, and my invention may be employed where this is not the case, as shown in Fig. 3, wherein the amplification of the oscillations is secured. In this arrangement two sets of grids and plates are employed. The oscillatory circuit S, V, K is connected between the electrodes $W_1$, $G_1$, being an electrode of each set. A second oscillatory circuit comprising $S^1$, $V^1$, $K^1$, is connected between the other electrodes $W_2$, $G_2$. The receiver circuit is connected between this second oscillatory circuit and the filament as shown.

In Fig. 4, I show my invention applied to a transmitting system. In this arrangement the oscillatory circuit L, K, is connected between the grids G and the plate W. The plate $W_2$ is connected to the filament in the usual way by the usual circuit comprising the impedances Q, choke coil Y and generator or other high voltage source P.

In Fig. 5, I show my invention as applied to a regenerative system. This is similar to Fig. 1 but in this arrangement the signal device circuit which connects the wing or plate $W_2$ with the filament, is inductively coupled with the inductance S of the oscillatory circuit, through the coil E, as shown. In this arrangement, the circuit $W_2$, E, T, B, F induces a current through the oscillatory circuit G, K, V, S, W by regenerative means, as will be readily understood.

Having now set forth the objects and nature of my invention, and having shown and described various arrangements embodying the principles thereof, what I claim as new and useful and of my own invention, and desire to secure by Letters Patent, is,—

1. The combination with an evacuated vessel having associated therewith a hot electrode and a plurality of cold electrodes, a circuit connecting two of said cold electrodes, an independent oscillating circuit connecting two of said cold electrodes, and a third circuit including a current source conductively connecting said hot electrode to one of said circuits.

2. The combination with an evacuated vessel having associated therewith a hot electrode and a plurality of cold electrodes, a circuit connecting two of said cold electrodes, an independent circuit connecting two of said cold electrodes and a third circuit including a source of current connecting said hot electrode and one of said circuits.

3. The combination with an evacuated vessel having associated therewith a hot electrode and a plurality of cold electrodes, an oscillating circuit connecting two of said cold electrodes, an independent oscillating circuit connecting two other of said cold electrodes and a third circuit including a current source connecting said hot electrode with one of said circuits.

4. The combination with an evacuated vessel having associated therewith a hot electrode, a pair of insulated grid electrodes and a pair of insulated plate electrodes, a circuit connecting a grid and a plate electrode, an independent circuit connecting the other grid and plate electrodes, and a third circuit including a source of current connecting said hot electrode and one of said circuits.

5. The combination with an evacuated vessel having associated therewith a hot electrode, a pair of insulated grid electrodes and a pair of insulated plate electrodes, a circuit connecting a grid and a plate electrode, an independent oscillating circuit connecting the other grid and plate electrodes, and a third circuit including a source of current connecting the hot electrode and one of said circuits.

6. The combination with an evacuated vessel having associated therewith a hot electrode, a pair of insulated grid electrodes and a pair of insulated plate electrodes, an oscillating circuit connecting a grid and plate electrode and an independent oscillating circuit connecting the other grid and plate electrodes, and a third circuit including a source of current connecting the hot electrode and one of said circuits.

In testimony whereof I have hereunto set my hand on this 15th day of February, A. D. 1917.

CHARLES VEYNE LOGWOOD.